(12) United States Patent
Nakamura et al.

(10) Patent No.: US 7,719,136 B2
(45) Date of Patent: May 18, 2010

(54) POWER SOURCE CONTROL CIRCUIT, POWER SUPPLY DEVICE, AND CONTROL METHOD FOR THE SAME

(75) Inventors: Toru Nakamura, Kasugai (JP); Hidekiyo Ozawa, Kasugai (JP)

(73) Assignee: Fujitsu Microelectronics Limited, Yokohama (JP)

( * ) Notice: Subject to any disclaimer, the term of this patent is extended or adjusted under 35 U.S.C. 154(b) by 155 days.

(21) Appl. No.: 11/446,140

(22) Filed: Jun. 5, 2006

(65) Prior Publication Data
US 2007/0205662 A1 Sep. 6, 2007

(30) Foreign Application Priority Data
Feb. 22, 2006 (JP) .............................. 2006-045956

(51) Int. Cl.
*H02J 1/10* (2006.01)
(52) U.S. Cl. ....................................................... 307/24
(58) Field of Classification Search ................... 307/11, 307/24, 32, 82
See application file for complete search history.

(56) References Cited

U.S. PATENT DOCUMENTS

| 5,808,879 | A | 9/1998 | Liu et al. |
|---|---|---|---|
| 6,018,233 | A | 1/2000 | Glennon |
| 6,037,752 | A | 3/2000 | Glennon |
| 6,144,327 | A | 11/2000 | Distinti et al. |
| 6,693,414 | B2 * | 2/2004 | Ando ........................ 323/303 |
| 6,768,225 | B2 | 7/2004 | Chang et al. |
| 7,105,947 | B1 * | 9/2006 | Marshall et al. ............... 307/28 |
| 7,166,933 | B2 * | 1/2007 | Muramatsu et al. .......... 307/82 |
| 7,345,378 | B2 * | 3/2008 | Pearce ........................ 307/24 |
| 2003/0009702 | A1 | 1/2003 | Park |

FOREIGN PATENT DOCUMENTS

| CN | 1396509 | 2/2003 |
|---|---|---|
| JP | 2003-061341 A | 2/2003 |
| JP | 2003-333833 A | 11/2003 |
| JP | 2005-210884 A | 8/2005 |

OTHER PUBLICATIONS

"Chinese Office Action" [Partial English Translation], Chinese Patent Application No. 200610087186.4, dated Oct. 10, 2008.
Taiwanese Search Report (and partial English-language Translation) dated Mar. 21, 2009 regarding Taiwanese App. No. 095118229.

* cited by examiner

*Primary Examiner*—Albert W Paladini
*Assistant Examiner*—Michael Rutland Wallis
(74) *Attorney, Agent, or Firm*—Fujitsu Patent Center

(57) ABSTRACT

A control circuit for a power supply device, a power supply device, and the like are provided in which the power supply device has a plurality of DC/DC converters provided for generating voltage while the mutual relationship of potential between the voltage outputs is maintained. The control circuit 20 in the power supply device 10 which outputs different direct current voltages (VCC, VBGP, and VBGN) includes a voltage setting unit 22 for determining the setting level of a second direct current voltage VBGP which has a potential relationship with the setting level of the first direct current voltage VCC which is one of a plurality of the different direct current voltages.

10 Claims, 6 Drawing Sheets

CIRCUITRY DIAGRAM OF POWER SUPPLY DEVICE ACCORDING TO FIRST EMBODIMENT OF PRESENT INVENTION

FIG. 1 CIRCUITRY DIAGRAM OF POWER SUPPLY DEVICE ACCORDING TO FIRST EMBODIMENT OF PRESENT INVENTION

FIG. 2 CIRCUITRY DIAGRAM OF POWER SUPPLY DEVICE ACCORDING TO SECOND EMBODIMENT OF PRESENT INVENTION

FIG. 3 CIRCUITRY DIAGRAM OF POWER SUPPLY DEVICE ACCORDING TO THIRD EMBODIMENT OF PRESENT INVENTION

BLOCK DIAGRAM SHOWING CONNECTION BETWEEN CONVENTIONAL
POWER SUPPLY DEVICE AND EXTERNAL DEVICE

FIG. 5 (PRIOR ART) CIRCUITRY DIAGRAM OF CONVENTIONAL POWER SUPPLY DEVICE CONNECTED WITH LOGIC CIRCUIT IN EXTERNAL DEVICE

CIRCUITRY DIAGRAM OF LOGIC CIRCUIT

POWER SOURCE CONTROL CIRCUIT, POWER SUPPLY DEVICE, AND CONTROL METHOD FOR THE SAME

CROSS-REFERENCE TO RELATED APPLICATIONS

This application is based upon and claims the benefit of priority from each of the prior Japanese Patent Application No. 2006-045956 filed on Feb. 22, 2006, the entire contents of which are incorporated herein by reference.

BACKGROUND OF THE INVENTION

1. Field of the Invention

The present invention relates to a power supply device control circuit, a power supply device, and a control method for the same.

2. Description of the Related Art

As up-to-date ICs (integrated circuits) have been improved in the integration and reduced in the source voltage, they are demanded for being lowered and minimized in the power consumption. Also, with the source voltage becoming reduced, the threshold voltage of MOS transistors in each IC is lowered. As the threshold voltage is lowered, its sub threshold area will be declined in the characteristic of current interruption. This may hence cause a current to be leaked during the off state where no voltage is applied between the gate and the source of a MOS transistor. Although the power consumption is successfully lowered and minimized, the effect of current leakage will hardly be eliminated.

For attenuating the current leakage at a MOS transistor where the threshold voltage is lowered, a technique is known of controlling the backgate voltage. According to the technique, by modifying the back gate voltage deeply at the off state, the characteristics of current interruption in the sub threshold area can be improved. The action of deeply modifying the back gate voltage means that when the transistor is of NMOS type, a voltage lower than that at the source is applied to the P substrate. When the transistor is of PMOS type, a voltage higher than the source voltage is applied to the N substrate. In the MOS transistor, while the back gate voltage is shallowly modified to maintain the on state with a low threshold voltage, the current leakage can be minimized during the off state where no voltage is applied between the gate and the source.

Such a power supply device having the above described IC is designed to connect with a variety of electronic apparatuses which are different in the voltage requirement and thus includes a plurality of DC/DC converters (as disclosed in Japanese Unexamined Patent Publication Nos. 2003-61341, 2005-210884). The power supply device having the described IC may be arranged to detect the power efficiency of each of the DC/DC converters and when any DC/DC converter is found having its power efficiency lower than a predetermined setting level, cancel the action of the DC/DC converter (as disclosed in Japanese Unexamined Patent Publication No. 2003-333833).

A power supply device 100 shown in FIGS. 4 and 5 includes a plurality of DC/DC converters 120 to 140 and is connected to an external device 200. The power supply device 100 supplies the external device 200 with a source voltage VCC, gate voltages VBGP and VBGN to be supplied to the back gate of its MOS transistor, an input/output voltage VIO, and other voltages VXX. The power supply device 100 exchanges a variety of data carried on the control signal (IIC) with the external device 200. The external device 200 consists of one or more integrated circuits.

The power supply device 100 includes an interface controller 150 as shown in FIG. 5. The interface controller 150 is connected with a bus B1. The external device 200 includes such a NAND circuit 210 as shown in FIGS. 5 and 6. The DC/DC converters 120 to 140 in the power supply device 100 are arranged to modify the source voltage VCC to be supplied to the NAND circuit 210, the back gate voltage VBGP to be supplied to the back gates of the PMOS transistors FET10 and FET30 in the NAND circuit 210, and the back gate voltage VBGN to be supplied to the back gates of the NMOS transistors FET20 and FET40 in the NAND circuit 210 respectively. Denoted by X and Y in the drawings are input terminals to which a high level signal or a low level signal is supplied and denoted by Z is an output terminal.

For example, when its interface controller 150 receives an action command signal from an external device connected to the interface controller 150, the power supply device 100 instructs the register REG0 to store the action command signal. When the action command signal carries a stop command, the action of the DC/DC converters 120 to 140 is canceled. When the action command signal carries an action command, the DC/DC converters 120 to 140 are activated.

When its interface controller 150 receives a voltage operation signal for the source voltage VCC from an external device connected to the interface controller 150, the received voltage operation signal is stored in the register REG1 and an analog voltage signal (reference voltage) corresponding to the voltage operation signal is inputted via a D/A converter DAC1 to an error amplifier ERA1. Then, the power supply device 100 drives the error amplifier ERA1 to compare a feedback of the source voltage VCC with the reference voltage and thus controls so that the source voltage VCC is close to the reference voltage. Also, when its interface controller 150 receives voltage operation signals for the gate voltages VBGP and VBGN from an external device connected to the interface controller 150, the power supply device 100 instructs the error amplifiers ERA2 and ERA3 to modify the back gate voltages VBGP and VBGN, which are supplied to the back gates of the MOS transistors FET10 to FET40, to be close to their reference levels in the same manner as of the error amplifier ERA1 controlling the source voltage VCC to its reference level. Accordingly, the power supply device 100 allows the DC/DC converters 120 to 140 to modify the voltages VCC, VBGP, and VBGN to their respective optimum levels independently in response to the action command signals and the voltage operation signals received at its interface controller 150.

SUMMARY OF THE INVENTION

However, as the power supply device 100 enables to modify the voltages VCC, VBGP, and VBGN separately, its DC/DC converter 130 may control the voltage VBGP, which is supplied to the back gates of the PMOS transistors FET10 and FET30, to a level lower than the source voltage VCC. This will cause a large amount of current to flow from the sources to the back gates of the PMOS transistors FET10 and FET30, thus resulting in breakdown of the PMOS transistors FET10 and FET30.

The present invention has been developed in view of the above aspect and its object is to provide a control circuit for a power supply device, a power supply device, and a control method of the same, where the power supply device has a plurality of DC/DC converters provided for delivering voltage outputs while the mutual relationship of potential between the voltage outputs is maintained.

According to the first aspect of the present invention, there is provided a control circuit for a power supply device which outputs a plurality of direct current voltages different in a voltage level, comprising:

a voltage setting unit for determining the setting level of a second direct current voltage having a potential relation to the setting level of a first direct current voltage which is one of the plurality of the direct current voltages.

According to the control circuit for a power supply device of the first aspect and the power supply device of the second aspect, the second direct current voltage having a potential relationship with the setting level of the first direct current voltage is determined by the voltage setting unit. As the second direct current voltage is determined not separately of the setting level of the first direct current voltage, a plurality of the direct current voltages can be delivered while their mutual potential relationship is maintained.

According to the third aspect of the present invention, there is provided a control method of a power supply device which outputs a plurality of direct current voltages which are different in the voltage level, comprising the step of:

determining the setting level of a second direct current voltage which has a potential relation to the setting level of a first direct current voltage which is one of the plurality of the different direct current voltages.

According to the method of controlling a power supply device of the third aspect, the second direct current voltage having a potential relationship with the setting level of the first direct current voltage is determined by the voltage setting unit. As the second direct current voltage is determined not separately of the setting level of the first direct current voltage, a plurality of the direct current voltages can be delivered while their mutual potential relationship is maintained.

The above and further objects and novel features of the invention will more fully appear from the following detailed description when the same is read in connection with the accompanying drawings. It is to be expressly understood, however, that the drawings are for the purpose of illustration only and are not intended as a definition of the limits of the invention.

DETAILED DESCRIPTION OF THE PREFERRED EMBODIMENTS

First Embodiment

Figure 1:
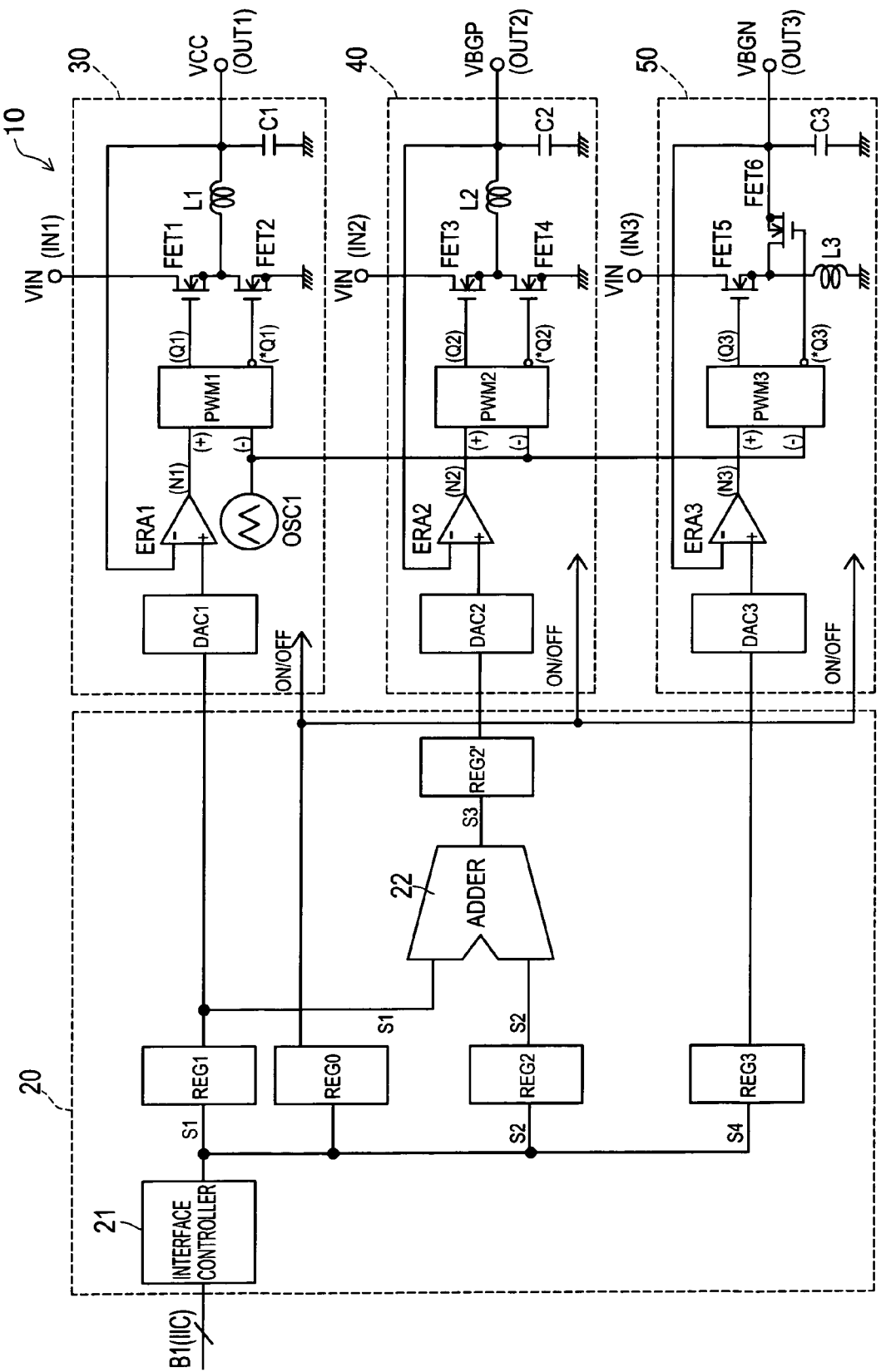
FIG. 1 is a circuitry diagram of a power supply device according to a first embodiment of the present invention.

A first embodiment of the present invention will be described with reference to FIG. 1. As shown in FIG. 1, a power supply device 10 of the first embodiment comprises a controller 20 and first to third DC/DC converters 30, 40, and 50. The controller 20 includes an interface controller 21, four registers REG0 to REG3, an adder 22, and a register REG2'. The controller 20 corresponds to a control circuit according to the present invention.

The interface controller 21 is connected with a bus B1. The bus B1 is connected with an external device (for example, an electronic apparatus), which is not shown. Further, the interface controller 21 is connected to the four registers REG0, REG1, REG2, and REG3 respectively, as shown in FIG. 1.

The register REG0 is connected to the first DC/DC converter 30. The register REG0 is also connected to the second DC/DC converter 40 and the third DC/DC converter 50.

As shown in FIG. 1, the register REG1 is connected to a D/A converter DAC1 of the first DC/DCconverter 30. The register REG3 is connected to a D/A converter DAC3 of the third DC/DC converter 50.

The registers REG1 and REG2 are connected to the adder 22. The adder 22 is connected to the register REG2'. The register REG2' is connected to a D/A converter DAC2 of the second DC/DC converter 40.

The first DC/DC converter 30 includes, as shown, a main switching transistor FET1, a sync side switching transistor FET2, a chalk coil L1, and a capacitor C1. The main switching transistor FET1 is connected at a drain to an input terminal (IN1), so that a direct current input voltage VIN is applied to the main switching transistor FET1 via the input terminal (IN1). A source of the main switching transistor FET1 is connected to a drain of the sync side switching transistor FET2. The source of the sync side switching transistor FET2 is connected to a ground. Further, both the source of the main switching transistor FET1 and the drain of the sync side switching transistor FET2 are connected to the chalk coil L1. The chalk coil L1 is connected to an output terminal (OUT1). The capacitor C1 is connected between the output terminal (OUT1) and the ground. The output terminal (OUT1) is connected to the source input terminal of a NAND circuit of an electronic apparatus as not shown.

The first DC/DC converter 30 further includes an error amplifier ERA1, a D/A converter DAC1, a triangle wave oscillator OSC1, and a PWM comparator PWM1. An inverting input terminal of an error amplifier ERA1 is connected to the output terminal (OUT1). Meanwhile, a non-inverted input terminal of the error amplifier ERA1 is connected with the D/A converter DAC1.

The triangle wave oscillator OSC1 outputs a triangle wave signal. The triangle wave signal oscillates within a range of a constant voltage level (for example, between 1.0V and 2.0V). The triangle wave oscillator OSC1 is composed of an OP amplifier, a resistor, and a capacitor, etc.

A PWM comparator PWM1 has a positive input terminal (+) and a negative input terminal (−). The positive input terminal (+) is connected with an output terminal (N1) of the error amplifier ERA1, while the negative input terminal (−) is connected with the triangle wave oscillator OSC1. Further, an output terminal (Q1) of the PWM comparator PWM1 is connected to a gate of the main switching transistor FET1 while an inverted output terminal (*Q1) to a gate of the sync side switching transistor FET2.

The second DC/DC converter 40 has a structure similar to that of the first DC/DC converter 30, except that a triangle wave oscillator is not provided. In the first embodiment as shown, the second DC/DC converter 40 can be constructed by replacing the error amplifier ERA1, the D/A converter DAC1, the PWM comparator PWM1, the main switching transistor FET1, the sync side switching transistor FET2, the chalk coil L1, and the capacitor C1 in the first DC/DC converter 30, in turn, with an error amplifier ERA2, the D/A converter DAC2, a PWM comparator PWM2, a main switching transistor FET3, a sync side switching transistor FET4, a chalk coil L2, and a capacitor C2 respectively.

A negative input terminal (−) of the PWM comparator PWM2 is connected to the triangle wave oscillator OSC1 of the first DC/DC converter 30. Denoted by N2, IN2, and OUT2 in FIG. 1 are an output terminal of the error amplifier ERA2, an input terminal of the second DC/DC converter 40, and an output terminal of the second DC/DC converter 40, respectively. An output terminal and an inverted output terminal of the PWM comparator PWM2 are denoted by Q2 and *Q2, respectively. The output terminal (OUT2) is connected to a back gate of a PMOS transistor composing the NAND circuit of an electronic apparatus as not shown, for example.

The third DC/DC converter 50 includes an NMOS transistor FET5, an NMOS transistor FET6, a chalk coil L3, and a capacitor C3. The NMOS transistor FET5 is connected at the drain to an input terminal (IN3) for receiving a direct current input voltage VIN. The source of the NMOS transistor FET5 is connected to the chalk coil L3 which is in turn connected to the ground.

The source of the NMOS transistor FET5 is connected to a drain of the NMOS transistor FET6. The source of the NMOS transistor FET6 is connected to an output terminal (OUT3). The capacitor C3 is connected between the output terminal (OUT3) and the ground. The output terminal (OUT3) is connected to the back gate of an NMOS transistor composing the NAND circuit of an electronic apparatus as not shown.

The third DC/DC converter 50 includes an error amplifier ERA3, the D/A converter DAC3, and a PWM comparator PWM3. An inverted input terminal of the error amplifier ERA3 is connected to the output terminal (OUT3). Meanwhile, a non-inverted input terminal of the error amplifier ERA3 is connected to the D/A converter DAC3.

A positive input terminal (+) of the PWM comparator PWM3 is connected to an output terminal (N3) of the error amplifier ERA3 and a negative input terminal (−) is connected to the triangle wave oscillator OSC1 of the first DC/DC converter 30. An output terminal (Q3) of the PWM comparator PWM3 is connected to the gate of the NMOS transistor FET5. An inverted output terminal (*Q3) of the PWM comparator PWM3 is connected to the gate of the NMOS transistor FET6.

A control method of the power supply device 10 will now be described. The interface controller 21 shown in FIG. 1 receives data on an operation condition of an electronic apparatus connected with the bus B1 and the like. The interface controller 21 outputs the received data to the registers REG0 to REG3 depending on contents of the received data.

The interface controller 21 outputs an action command signal ON/OFF to the register REG0. The action command signal ON/OFF is used for turning on and off the power supply devices of the DC/DC converters 30 to 50.

The register REG0, after storing information on an action/stop of the action command signal ON/OFF, outputs the signal ON/OFF to the power supply devices of the respective DC/DC converters 30 to 50. When the power supply devices of the DC/DC converters 30 to 50 receive the action command signal ON/OFF, they can be switched on or off for the action or the stop.

The interface controller 21 outputs a source voltage command signal S1 to the register REG1. The source voltage command signal S1 is used for modifying the source voltage VCC supplied to an optimum voltage level which is fed to an electronic apparatus (including the NAND circuit) connected with the output (OUT1) of the first DC/DC converter 30. The source voltage VCC corresponds to a first direct current voltage according to the present invention. The source voltage command signal S1 corresponds to a setting of the first direct current voltage according to the present invention.

The register REG1 stores the source voltage command signal S1 and then outputs the signal S1 to the D/A converter DAC1 of the first DC/DC converter 30. The D/A converter DAC1 outputs an analog voltage signal (a reference voltage) which is then received by the source voltage command signal S1 to the non-inverted input terminal of the error amplifier ERA1. Since the register REG1 stores the setting of the source voltage command signal S1 used for modifying the source voltage VCC (the first direct current voltage) to an optimum level, it corresponds to a first direct current voltage data storage according to the present invention.

The source voltage VCC is fed back to the inverted input terminal of the error amplifier ERA1, as shown. The error amplifier ERA1 compares the fed-back source voltage VCC with the reference voltage to output an error output voltage to the positive input terminal (+) of the PWM comparator PWM1.

The triangle wave signal is inputted to the negative input terminal (−) of the PWM comparator PWM1 by the triangle wave oscillator OSC1. The PWM comparator PWM1 compares the voltage level of the triangle wave signal with the error output voltage.

When the error output voltage is greater than the voltage level of the triangle wave signal, the PWM comparator PWM1 outputs a high level. PWM signal from the output terminal (Q1). Simultaneously, the PWM comparator PWM1 outputs a low level inverted PWM signal from the inverted output terminal (*Q1). Meanwhile, when the error output voltage level is smaller than the voltage level of the triangle wave signal, the PWM comparator PWM1 outputs a low level PWM signal from the output terminal (Q1). Simultaneously, the PWM comparator PWM1 outputs a high level inverted PWM signal from the inverted output terminal (*Q1).

The PWM signal is inputted to the gate of the main switching transistor FET1. The main switching transistor FET1 is turned on when the PWM signal is at its high level and turned off when at its low level. The inverted PWM signal is inputted to the gate of the sync side switching transistor FET2. The sync side switching transistor FET2 is turned off when the inverted PWM signal is at its low level and turned on when at its high level. By repeating the shift of the PWM signal between the high level and the low level and the shift of the inverted PWM signal between the high level and the low level, such that the source voltage VCC is adjusted to its optimum voltage level, and is then supplied via the output terminal (OUT1) to the electronic apparatus (including the NAND circuit).

Also, the interface controller 21 outputs an offset voltage command signal S2 to the register REG2. The offset voltage command signal S2 is used for modifying the voltage VBGP, which is supplied to the back gate of the PMOS transistor composing the NAND circuit, to a level which is greater than the source voltage VCC. In the present embodiment, for example, the interface controller 21 determines a difference setting value (offset voltage) between the optimum setting of the source voltage VCC and the optimum setting of the gate voltage VBGP based on the input data supplied along the bus B1 from the external electronic apparatus. Alternatively, the difference setting value (offset voltage) can be determined with an external controller or the like (not shown) provided separately of the power supply device 10. As the gate voltage VBGP is set greater than the source voltage VCC in response to the offset voltage command signal S2, it corresponds to a second direct current voltage according to the present invention. The offset voltage command signal S2 is equivalent to a setting of the second direct current voltage according to the present invention.

The register REG2 stores the offset voltage command signal S2 and then outputs the signal S2 to the adder 22. Since the register REG2 stores the offset voltage command signal S2 which determines the difference setting between the setting of the source voltage VCC (the setting of the first direct current voltage) and the setting of the gate voltage VBGP (the setting of the second direct current voltage), it corresponds to a different voltage data storage according to the present invention.

The source voltage command signal S1 is inputted to the adder 22, as shown. The adder 22 adds the offset voltage command signal S2 (the offset voltage) to the source voltage command signal S1 to output a sum signal S3 which is then outputted to the register REG2'. The sum signal S3, obtained by adding the source voltage command signal S1 and the offset voltage command signal S2, is used for determining the gate voltage VBGP (the second direct current voltage). Since the adder 22 adds the source voltage command signal S1 used for determining the source voltage VCC (the first direct current voltage) and the offset voltage command signal S2 used for determining the setting difference to output the sum signal S3 which determines the gate voltage VBGP (the second direct current voltage), it corresponds to an adder according to the present invention.

The register REG2' stores the sum signal S3 and then outputs the sum signal S3 to the D/A converter DAC2 of the second DC/DC converter 40. The D/A converter DAC2 outputs an analog voltage signal (a reference voltage) corresponding to the sum signal S3 to the non-inverted input terminal of the error amplifier ERA2. As the register REG2' stores the sum signal S3 which determines the gate voltage VBGP (the second direct current voltage), it corresponds to a sum direct current voltage data storage according to the present invention.

The gate voltage VBGP is fed back to the inverted input terminal of the error amplifier ERA2, as shown. The error amplifier ERA2 compares the gate voltage VBGP with the reference voltage to output an error output voltage to the positive input terminal (+) of the PWM comparator PWM2.

The triangle wave signal is inputted to the negative input terminal (−) of the PWM comparator PWM2 by the triangle wave signal from the triangle wave oscillator OSC1 in the first DC/DC converter 30. The PWM comparator PWM2, like the PWM comparator PWM1, outputs the PWM signal and the inverted PWM signal to the gate of the main switching transistor FET3 and the gate of the sync side switching transistor FET4, respectively. Similar to the above-mentioned control method of the source voltage VCC, the PWM signal is repeatedly shifted between the high level and the low level while the inverted PWM signal is repeated shifted between the low level and the high level, whereby the gate voltage VBGP can be controlled to a level greater than the source voltage VCC. The gate voltage VBGP is supplied via the output terminal (OUT2) to the back gate of the PMOS transistor composing the NAND circuit.

The interface controller 21 also outputs a back gate voltage command signal S4 to the register REG3. The back gate voltage command signal S4 is used for determining a gate voltage VBGN which is supplied to the back gate of the NMOS transistor composing the NAND circuit.

The register REG3 stores the back gate voltage command signal S4 and then outputs the signal S4 to the D/A converter DAC3 in the third DC/DC converter 50. The D/A converter DAC3 outputs an analog voltage signal (a reference voltage) corresponding to the back gate voltage command signal S4 to the non-inverted input terminal of the error amplifier ERA3.

The gate voltage VBGN is fed back to the inverted input terminal of the error amplifier ERA3, as shown. The error amplifier ERA3 compares the fed-back gate voltage VBGN with the reference voltage to output an error output voltage to the positive input terminal (+) of the PWM comparator PWM3.

The triangle wave signal is inputted to the negative input terminal (−) of the PWM comparator PWM3 by the triangle wave oscillator OSC1 in the first DC/DC converter 30. The PWM comparator PWM3 like the PWM comparators PWM1 and PWM2 outputs the PWM signal and the inverted PWM signal to the gate of the NMOS transistor FET5 and the gate of the NMOS transistor FET6, respectively. Since the PWM signal is repeatedly shifted between the high level and the low level while the inverted PWM signal is repeated shifted between the low level and the high level, the gate voltage VBGN remains at an optimum voltage level and thus the gate voltage VBGN is supplied via the output terminal (OUT3) to the backgate of the NMOS transistor composing the NAND circuit.

Effect of the First Embodiment

In the power supply device 10 and the control circuit thereof 20 of the first embodiment, the adder 22 adds an offset between the setting of the source voltage VCC and the setting of the gate voltage VBGP to the setting of the source voltage VCC thus to output the sum signal S3 which determines the gate voltage VBGP. This allows the sum signal S3 to remain greater than the setting of the source voltage VCC, hence protecting the PMOS transistor of the NAND circuit from being damaged by an excessive amount of current.

According to the control method of the power supply device 10 of the first embodiment, the offset between the setting of the source voltage VCC and the setting of the gate voltage VBGP is added to the setting of the source voltage VCC so that the sum signal S3 which determines the gate voltage VBGP is outputted. This allows the sum signal S3 to remain greater than the setting of the source voltage VCC, hence protecting the PMOS transistor of the NAND circuit from being damaged by an excessive amount of current.

In the power supply device 10 and the control circuit thereof 20 of the present embodiment, the resistor REG1 stores the source voltage command signal S1 used for determining the source voltage VCC and the resistor REG2 stores the offset voltage command signal S2 used for determining a difference between the source voltage VCC and the gate voltage VBGP. Accordingly, even if the adder 22 connected to the two registers REG1 and REG2 executes processing, the resisters REG1 and REG2 can temporarily store the source voltage command signal S1 and the offset voltage command signal S2, respectively. Also, if the interface controller 21 outputs its command signals S1 and S2 once, the respective signals S1 and S2 are stored in the registers REG1 and REG2. Consequently, the interface controller 21 need not output the two command signals S1 and S2 continuously to the resisters REG1 and REG2 respectively, so that the signals S1 and S2 will be stored in the registers REG1 and REG2.

In the power supply device 10 and the control circuit thereof 20 of the present embodiment, the register REG2' stores the sum signal S3 outputted by the adder 22. The sum signal S3 is used for determining the gate voltage VBGP (the second direct current voltage). The resister REG2' can store the sum signals S3 in a succession.

Second Embodiment

Figure 2:
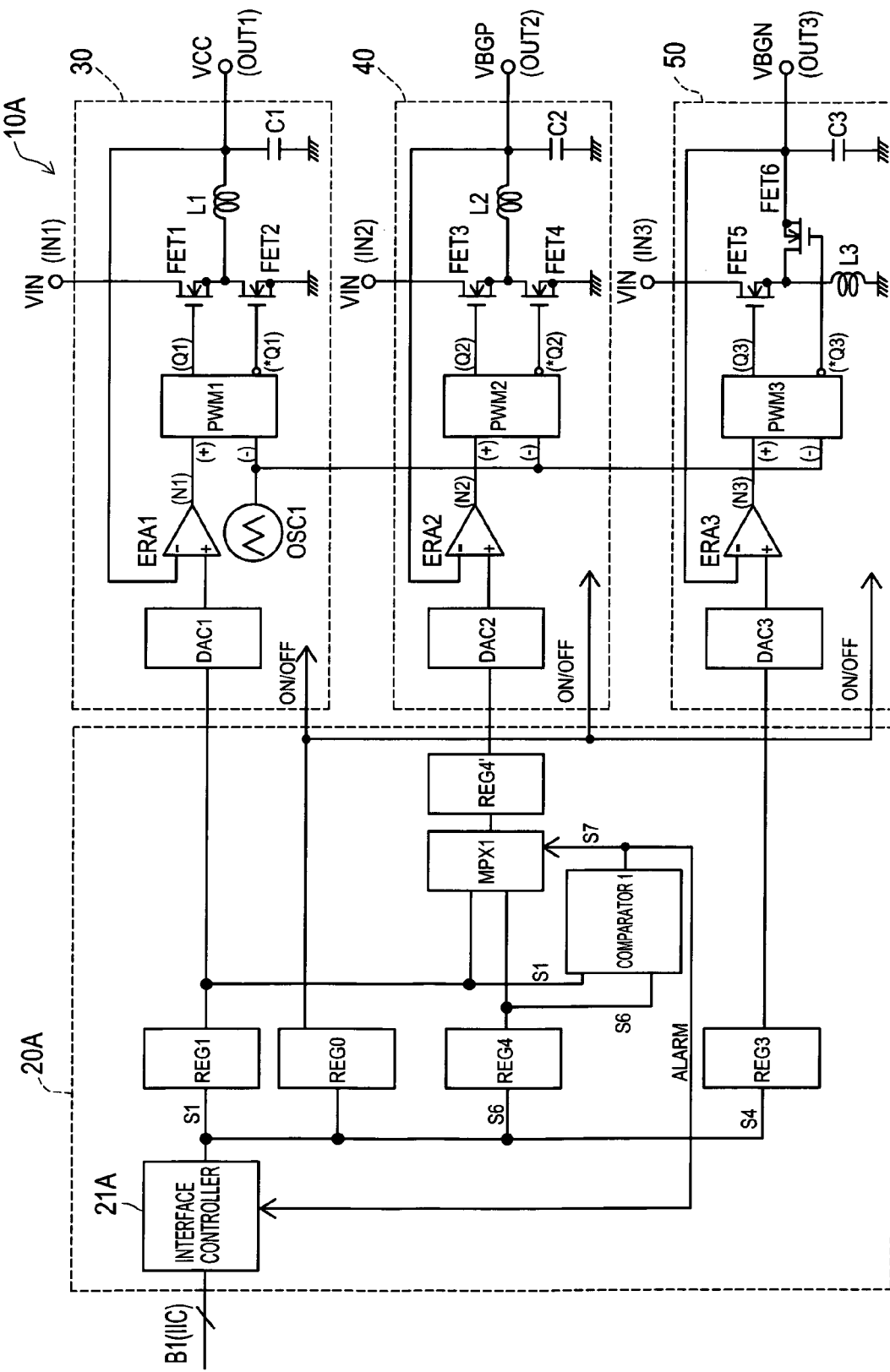
FIG. 2 is a circuitry diagram of a power supply device according to a second embodiment of the present invention.

A second embodiment of the present invention will be described with reference to FIG. 2. A power supply device 10A of the second embodiment comprises, as shown, a controller 20A, first to third DC/DC converters 30, 40, and 50. The controller 20A includes an interface controller 21A, four registers REG0, REG1, REG3, and REG4, a comparator 1, a selector switch circuit MPX1, and a register REG4'. Like components are denoted by like numerals as those of the components of the power supply device 10 of the first embodiment and will be explained in no more detail.

The two registers REG1 and REG4 are connected to the comparator 1 and the selector switch circuit MPX1, as shown. The comparator 1 is connected to the selector switch circuit MPX1 and the interface controller 21A. The selector switch circuit MPX1 is connected to the register REG4'. The register REG4' is connected to a D/A converter DAC2 in the second DC/DC converter 40.

Next, the method of controlling the power supply device 10A will be explained. The same control method of the power supply device 10 will not be explained. The interface controller 21A outputs a source voltage command signal S1 as equal to that of the power supply device 10 of the first embodiment to the register REG1. The interface controller 21A also outputs a back gate voltage command signal S6 to the register REG4.

The register REG1 stores the source voltage command signal S1 and outputs the signal S1 to the comparator 1. The register REG4 stores the back gate voltage command signal S6 and outputs the signal S6 to the comparator 1. As the register REG4 stores the back gate voltage command signal S6 which determines the setting of a voltage VBGP (another direct current voltage), it corresponds a direct current data storage according to the present invention.

The comparator 1 compares the source voltage command signal S1 with the back gate voltage command signal S6. When the back gate voltage command signal S6 is smaller than the source voltage command signal S1, the comparator 1 outputs a switch activating signal S7 to the selector switch circuit MPX1. Upon receipt of the switch activating signal S7, the selector switch circuit MPX1 outputs the source voltage command signal S1 to the register REG4'. Since the comparator 1 compares between the source voltage command signal S1 (a setting of the first direct current) and the back gate voltage command signal S6 (a setting of another direct current voltage) and judges whether or not one of the two voltages is greater than the other, it corresponds to a comparator according to the present invention.

The comparator 1 outputs an alarm signal ALARM with the switch activating signal S7 to the interface controller 21A. The interface controller 21A receives and outputs the alarm signal ALARM via a bus B1 to the above electronic apparatus. The alarm signal ALARM is provided for notifying the electronic apparatus that the setting of the voltage VBGP transferred to the interface controller 21A is smaller than that of the source voltage VCC.

In the meanwhile, if the back gate voltage command signal S6 is equal to or greater than the source voltage command signal S1, the comparator 1 outputs not the alarm signal ALARM but the switch activating signal S7. Upon receipt of the switch activating signal S7, the selector switch circuit MPX1 outputs the back gate voltage command signal S6 to the register REG4'. As the selector switch circuit MPX1 is arranged responsive to the switch activating signal S7 for selecting and outputting either the source voltage command signal S or the back gate voltage command signal S6, it corresponds a selector according to the present invention.

The register REG4' stores either the source voltage command signal S1 or the back gate voltage command signal S6 and outputs the signal S1 or the signal S6 to a D/A converter DAC2 of the second DC/DC converter 40. The second DC/DC converter 40 operates in the same way as the second DC/DC converter 40 of the first embodiment for controlling the gate voltage VBGP to a level which is equal to or greater than the source voltage VCC.

As the register REG4' stores the setting of the second direct current voltage to be outputted from the selector switch circuit MPX1 (namely the source voltage command signal S1 or the back gate voltage command signal S6), it corresponds to a selected direct current voltage data storage according to the present invention.

Effect of the Second Embodiment

In the power supply device 10A and the control circuit thereof 20A of the second embodiment, the selector switch circuit MPX1 selects as the setting of the gate voltage VBGP the higher setting of the source voltage command signal S1 and the back gate voltage command signal S6, based on the comparison result of a magnitude correlation between the source voltage command signal S1 and the back gate voltage command signal S6. Accordingly, the gate voltage VBGP can remain equal to or higher than the source voltage.

According to the control method of the power supply device 10A of the second embodiment, either the source voltage command signal S1 or the back gate voltage command signal S6, whichever is higher in the voltage level is selected as the setting of the gate voltage VBGP. Accordingly, the gate voltage VBGP can remain equal to or higher than the source voltage.

In the power supply device 10A and the control circuit thereof 20A of the present embodiment, the resistor REG1 stores the source voltage command signal S1 provided for determining the source voltage VCC and the resistor REG4 stores the back gate voltage command signal S6 used for determining the gate voltage VBGP (the another direct current voltage). Accordingly, even if the comparator 1 connected to the two registers REG1 and REG4 execute processing, the resisters REG1 and REG4 can temporarily store the source voltage command signal S1 and the back gate voltage command signal S6 respectively. Also, as the command signals S1 and S6 are outputted to the respective registers REG1 and REG4 once by the interface controller 21A, the respective signals S1 and S6 are stored in the registers REG1 and REG4. Thus, the interface controller 21A need not to repeat the two command signals S1 and S6 continuously to the resisters REG1 and REG4 respectively, so that the respective signals S1 and S6 will be stored in the registers REG1 and REG4.

In the power supply device 10A and the control circuit thereof 20A of the present embodiment, the register REG4' stores either the source voltage command signal S1 or the back gate voltage command signal S6 outputted from the selector switch circuit MPX1. Both the command signals S1 and S6 are used for determining the gate voltage VBGP (the second direct current voltage). The resister REG4' can store either the signals S1 or S6 in a succession.

Third Embodiment

Figure 3:
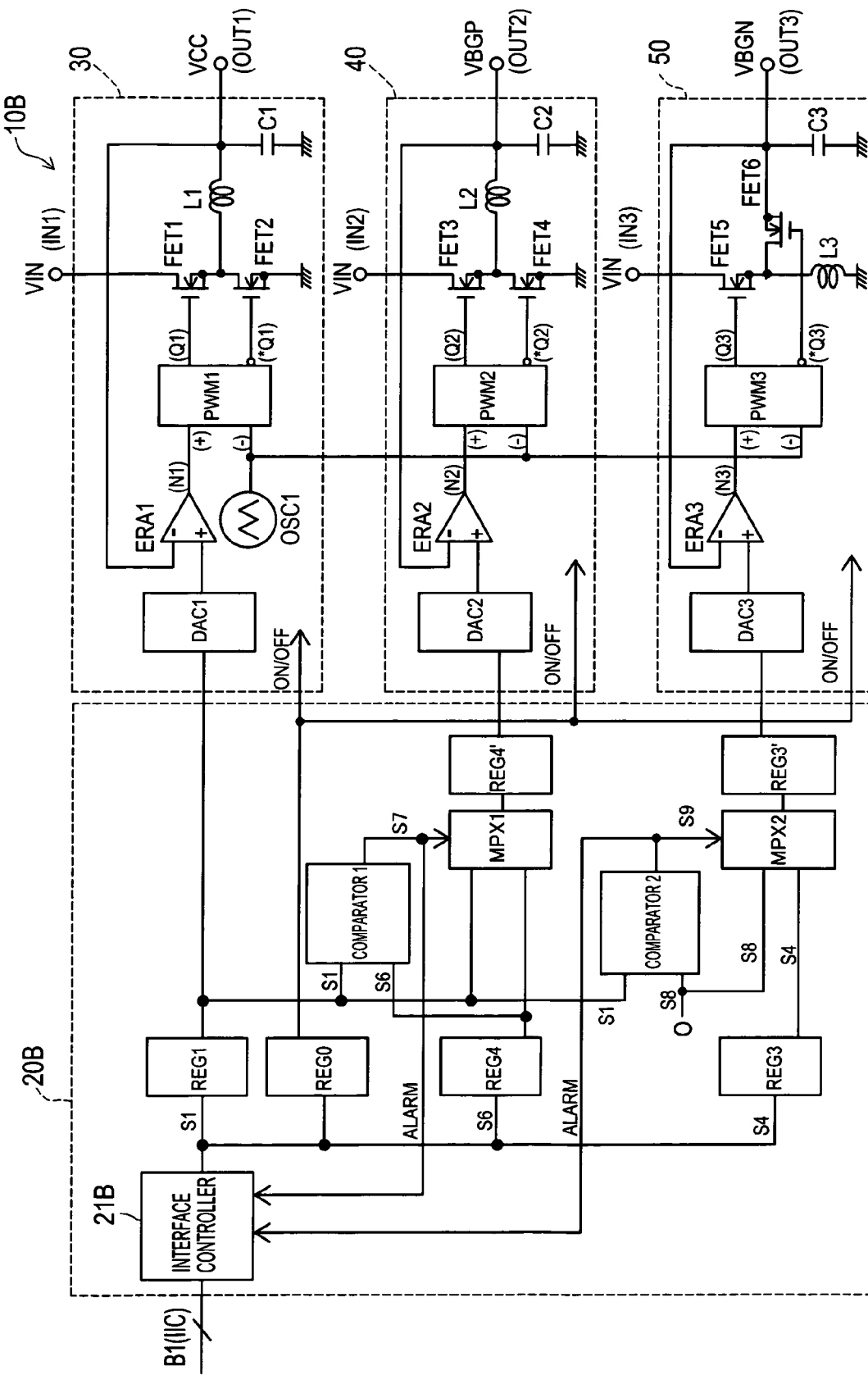
FIG. 3 is a circuitry diagram of a power supply device according to a third embodiment of the present invention.
Figure 4:
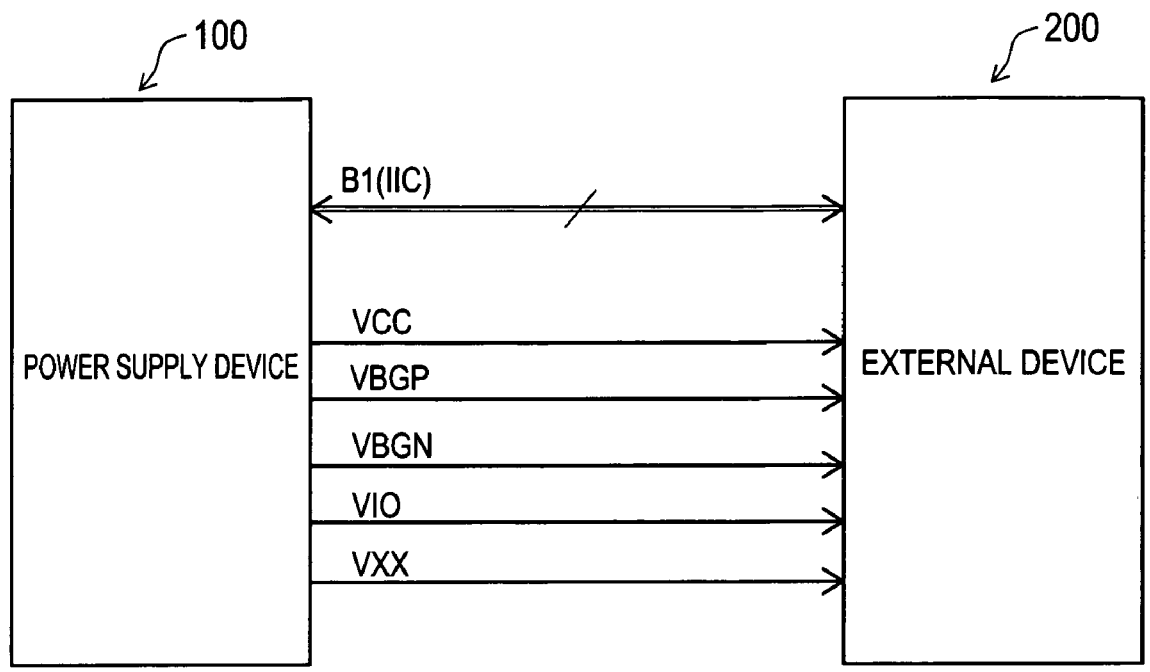
FIG. 4 is a block diagram showing the connection between a conventional power supply device and an external device.
Figure 5:
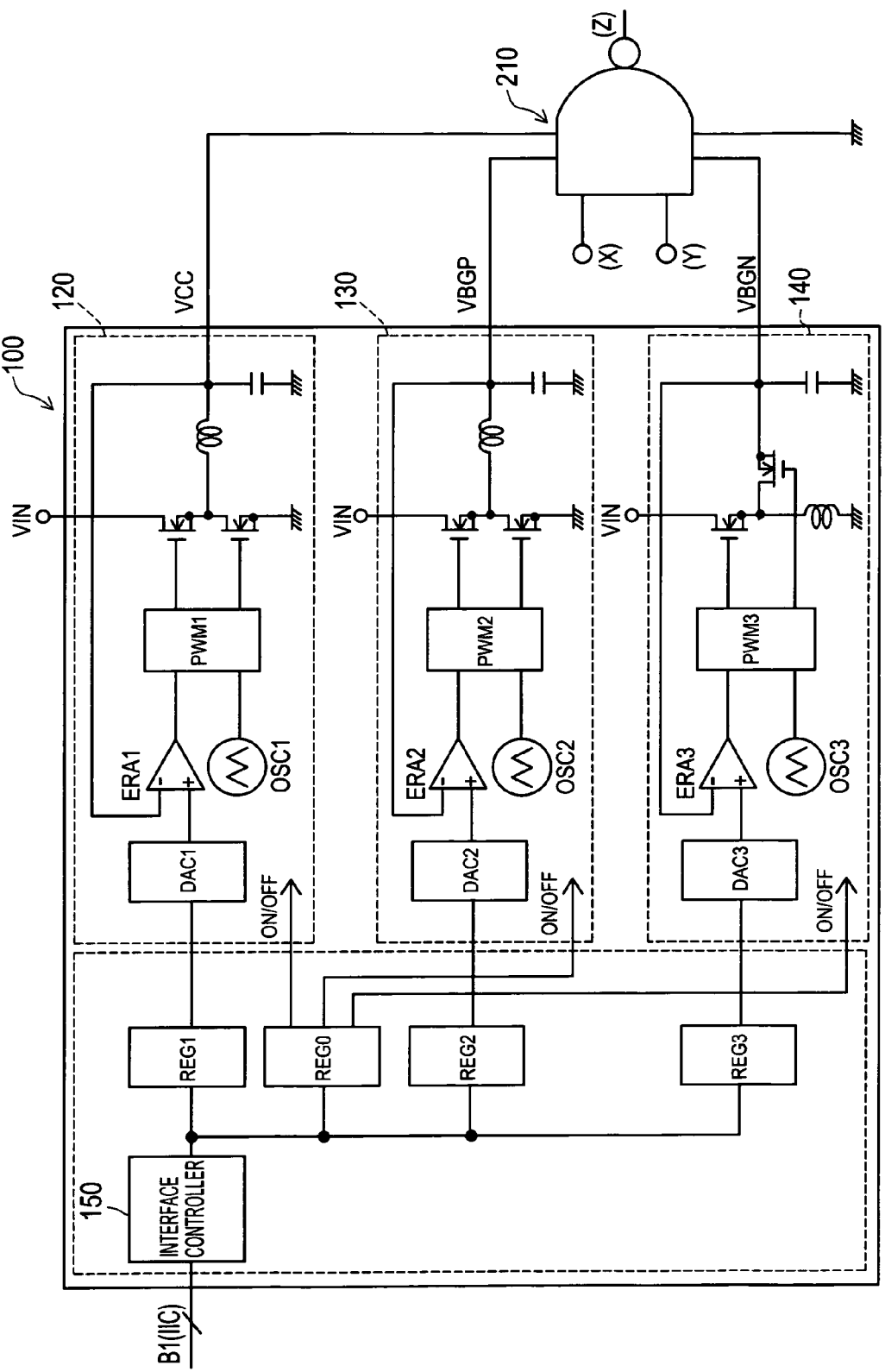
FIG. 5 is a circuitry diagram of the conventional power supply device connected with a logic circuit in the external device.
Figure 6:
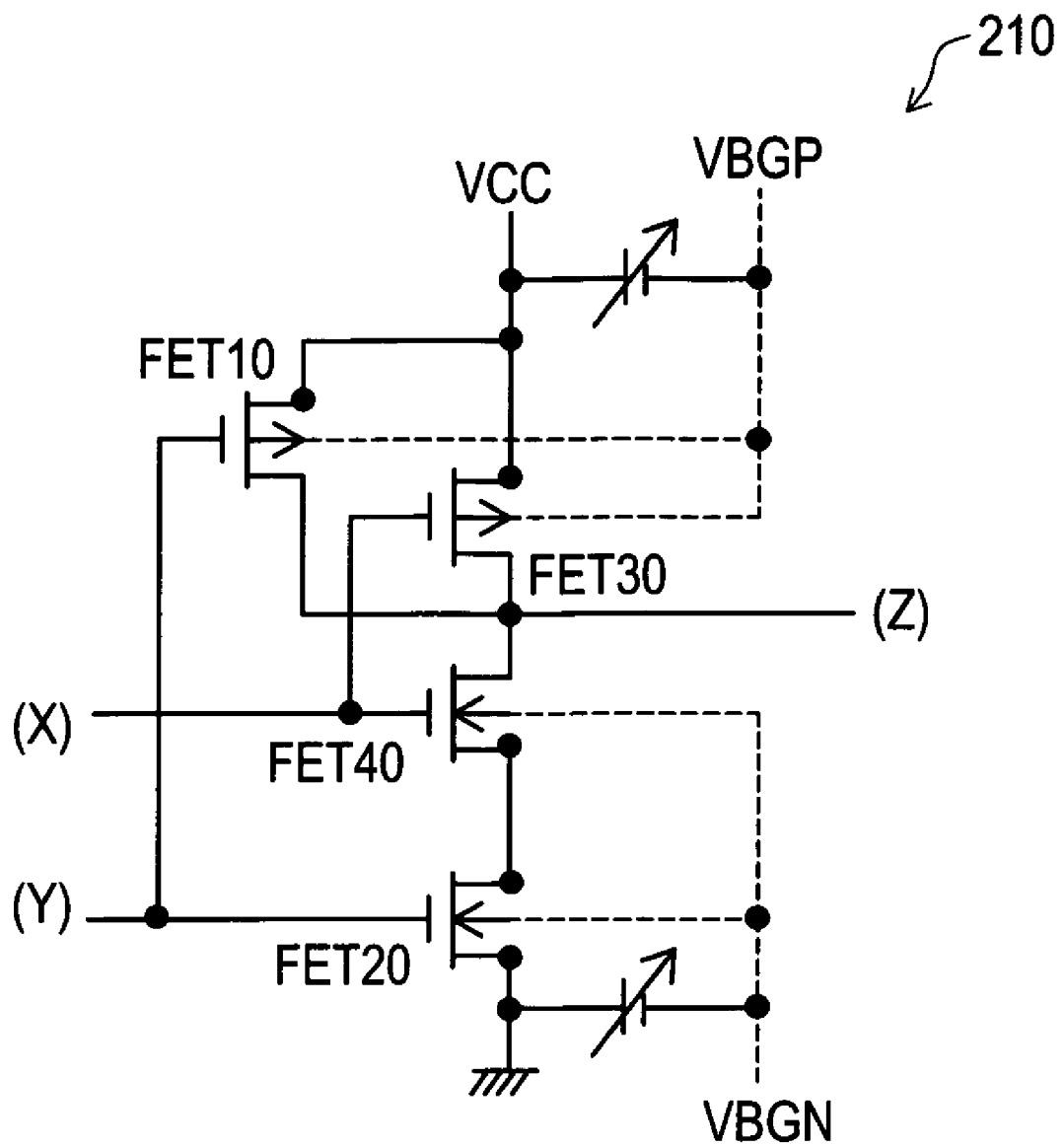
FIG. 6 is a circuitry diagram of the logic circuit.

A third embodiment of the present invention will be described with reference to FIG. 3. A power supply device 10B of Embodiment 3 comprises, as shown, a controller 20B, and first to third DC/DC converters 30, 40, and 50. The controller 20B includes an interface controller 21B, four registers REG0, REG1, REG3, and REG4, comparators 1 and 2, selector switch circuits MPX1 and MPX2, and registers REG3' and REG4'. Like components are denoted by the same numerals as those of the components of the power supply device 10 of the first embodiment or the power supply device 10A of the second embodiment and will be explained in no more detail.

The register REG1 is connected, as shown, to the two comparators 1 and 2. A zero voltage signal S8 is inputted to the comparator 2. The comparator 2 is connected to the selector switch circuit MPX2. The zero voltage signal S8 is inputted to the selector switch circuit MPX2 like the comparator 2. The selector switch circuit MPX2 is connected to the register REG3. The selector switch circuit MPX2 is also connected to the register REG3'.

The control method of the power supply device 10B will be explained, excluding the control methods equal to that of the power supply device 10 or 10A. The register REG1 stores a source voltage command signal S1 and then outputs the same to the two comparators 1 and 2.

The comparator 2 compares the source voltage command signal S1 and the zero voltage signal S8. The zero voltage signal S8 has data about the voltage setting (specifically data of turning the setting to zero in this embodiment). When the source voltage command signal S1 is equal to the zero voltage signal S8, the comparator 2 outputs a switch activating signal S9 to the selector switch circuit MPX2. As the comparator 2 compares the source voltage command signal S1 (the first direct current voltage) and the zero voltage signal S8 (the setting of another direct current voltage) for determining which one of the two voltages is higher than the other, it corresponds to a comparator according to the present invention.

As shown, a back gate voltage command signal S4 along with the zero voltage signal S8 are inputted to the selector switch circuit MPX2. Upon receipt of the switch activating signal S9, the selector switch circuit MPX2 outputs the zero voltage signal S8 to the register REG3'.

The comparator 2 also outputs an alarm signal ALARM in addition to the switch activating signal S9 to the interface controller 21B. Upon receipt of the alarm signal ALARM, the interface controller 21B outputs the alarm signal ALARM via a bus B1 to the above external electronic apparatus. The alarm signal ALARM is provided for notifying the electronic apparatus that that the voltage VBGN transferred to the interface controller 21B is greater than that of the source voltage VCC.

In the meanwhile, when the source voltage command signal S1 is not equal to the zero voltage signal S8, the comparator 2 outputs not the alarm signal ALARM but the switch activating signal S9. Upon receipt of the switch activating signal S9, the selector switch circuit MPX2 outputs the back gate voltage command signal S4 to the register REG3'. As the selector switch circuit MPX2 switches based on the switch activating signal S9 and selects and outputs either the zero voltage signal S8 or the back gate voltage command signal S4, it corresponds to a selector according to the present invention.

The register REG3' stores either the zero voltage signal S8 or the back gate voltage command signal S4 and then outputs the signal S8 or signal S4 to a D/A converter DAC3 of the third DC/DC converter 50. Since the register REG3' stores the setting of the second direct current voltage (namely the zero voltage signal S8 or the back gate voltage command signal S4 in this embodiment) to be outputted from the selector switch circuit MPX2, it corresponds to a selected direct current voltage data storage according to the present invention.

In the third DC/DC converter 50, the PWM comparator PWM3 compares an error voltage output of the error amplifier ERA3 with the voltage of a triangle wave signal and outputs its resultant PWM signal or inverted PWM signal to the gate of the NMOS transistor FET5 and the gate of the NMOS transistor FET6. Since the PWM signal is repeatedly shifted between the high level and the low level and the inverted PWM signal is repeatedly shifted between the low level and the high level, the voltage VBGN can be controlled to zero or a desired level.

Effect of the Third Embodiment

In the power supply device 10B and the control circuit thereof 20B of the third embodiment, the selector switch circuit MPX2 selects the zero voltage signal S8 as the setting of the voltage VBGN when the comparator 2 compares the two command signals for correlation in the magnitude and judges that the source voltage command signal S1 is equal to the zero voltage signal S8. Accordingly, when the source voltage command signal S1 is zero, the setting of voltage VBGN can remain at zero.

According to the control method of the power supply device 10B of the third embodiment, the zero voltage signal S8 is selected as the setting of the voltage VBGN when it is judged from the comparison in the magnitude between the source voltage command signal S1 and the zero voltage signal S8 that the source voltage command signal S1 is equal to the zero voltage signal S8. Accordingly, when the source voltage command signal S1 is zero, the setting of the voltage VBGN can remain at zero.

In the power supply device 10B and the control circuit thereof 20B of the present embodiment, the register REG3' stores either the zero voltage signal S8 outputted from the selector switch circuit MPX2 or the back gate voltage command signal S4. Both the command signals S8 and S4 are used for determining the gate voltage VBGN (the second direct current voltage). The resister REG3' can store either the signals S8 or S4 in a succession.

The present invention is not limited to the first to third embodiments but maybe implemented by any modification partially modified in the arrangement without departing from the scope of the present invention. For example, the power supply device of the present invention may include an extra adder in addition to the adder 22 (see FIG. 1). More particularly, the adder 22 is connected to the register REG2' (FIG. 1) which is then connected with the other adder. The extra adder may also be connected to a resistor which stores the offset voltage command signal similar to that of the first embodiment. This allows the adder 22 to input the sum signal S3 (FIG. 1) via the register REG2'to the other adder 22 and the other adder to add the offset voltage command signal to the sum signal S3 so as to output another sum signal for determining a desired setting of the direct current voltage. Since the extra adder outputs the sum signal used for determining a desired setting of the direct current voltage from the sum signal S3 outputted by the adder 22, it needs to have no more setting of the direct current voltage than that of the adder 22. The control method of such a modified power source includes determining a desired output of the direct current voltage from the sum signal S3, hence providing no more setting of the direct current voltage than the sum signal S3.

The power supply device of the embodiment may have two or more adders 22 connected in multiple stages so that the sum signal from the adder at the preceding stage is received by the adder at the succeeding stage. This allows the adder at the succeeding stage to produce from the sum signal determined by the adder at the preceding stage another sum signal for determining a desired setting of the direct current voltage. Accordingly, the adder at the succeeding stage needs to produce no more setting of the direct current voltage than that of the adder at the preceding stage.

In the first to third embodiments of the present invention, the voltage command signals S1 to S4, S6, and S8 is not limited to digital codes proportional to the voltage but may be digital codes indicative of the voltage but not proportional to the voltage. Each of the voltage command signals S1 to S4, S6, and S8 may also be a combination of a digital code indicative of the signal type (particularly the voltage command signal in the embodiments) and a digital code indicative of the voltage but not proportional to the voltage. The control circuits 20, 20A, and 20B in their respective power sources 10, 10A, and 10B of the first, second and third embodiments respectively may be implemented in the form of a single semiconductor chip or an assembly of semiconductor chips. The power supply devices 10, 10A, and 10B may be implemented in the form of a single semiconductor chip or an assembly of semiconductor chips. The power supply device 10 and its control circuit 20 may be implemented in modules. The electronic apparatus may include a power supply device equipped with a control circuit and DC/DC converters.

The control circuit for a power supply device, the power supply device, and the method of controlling the same according to the present invention are arranged in which the second direct current voltage is determined in potential relation with the setting level of the first direct current voltage. As the second direct current voltage is determined not separately of the setting level of the first direct current voltage, a plurality of the direct current voltages can be delivered while their mutual potential relationship is maintained.

What is claimed is:

1. A control circuit for a power supply device which outputs a plurality of direct current voltages different in a voltage level, comprising:
 a voltage setting unit to determine a setting level of a second direct current voltage so as to maintain a specified difference in potential between a voltage level of the second direct current voltage and a voltage level of a first direct current voltage which is one of the plurality of the direct current voltages,
 wherein the voltage setting unit includes an adder to add a setting level of the first direct current voltage with a difference between the setting level of the first direct current voltage and the setting level of the second direct current voltage.

2. The control circuit for a power supply device according to claim 1, comprising:
 a first direct current voltage data storage to store data of the setting level of the first direct current voltage; and
 a voltage difference data storage to store data of the difference between the setting levels.

3. The control circuit for a power supply device according to claim 1, comprising:
 a sum direct current voltage data storage to store data of the setting level of the second direct current voltage determined by the adder of the voltage setting unit.

4. The control circuit for a power supply device according to claim 1, wherein
 a plurality of the voltage setting units are provided and connected so that the setting level of the second direct current voltage determined by one of the plurality of the voltage setting units is delivered as the setting level of the first direct current voltage in another voltage setting unit which is different from the one of the plurality of the voltage setting units.

5. A power supply device for outputting a plurality of direct current voltages which are different in the voltage level, comprising:
 a voltage setting unit to determine a setting level of a second direct current voltage so as to maintain a specified difference in potential between a voltage level of the second direct current voltage and a voltage level of a first direct current voltage which is one of the plurality of the direct current voltages,
 wherein the voltage setting unit includes an adder to add a setting level of the first direct current voltage with a difference between the setting level of the first direct current voltage and the setting level of the second direct current voltage.

6. The power supply device according to claim 5, comprising:
 a first direct current voltage data storage to store data of the setting level of the first direct current voltage; and
 a voltage difference data storage to store data of the difference between the setting levels.

7. The control circuit for a power supply device according to claim 5, further comprising:
 a sum direct current voltage data storage to store data of the setting level of the second direct current voltage determined by the adder of the voltage setting unit.

8. The power supply device according to claim 5, wherein
 a plurality of the voltage setting units are provided and connected so that the setting level of the second direct current voltage determined by one of the plurality of the voltage setting units is delivered as the setting level of the first direct current voltage in another voltage setting unit which is different from the one of the plurality of the voltage setting units.

9. A control method of a power supply device which outputs a plurality of direct current voltages which are different in the voltage level, comprising:
 determining a setting level of a second direct current voltage so as to maintain a specified difference in potential between a voltage level of the second direct current voltage and a voltage level of a first direct current voltage which is one of the plurality of the direct current voltages,
 wherein the determining includes adding a setting level of the first direct current voltage with a difference between the setting level of the first direct current voltage and the setting level of the second direct current voltage.

10. The control method of a power supply device according to claim 9, comprising:
 when a plurality of setting levels of the second direct current voltage are set, setting one of the plurality of the setting levels of the second direct current voltage as the setting level of the first direct current voltage having a potential relation to setting level of the another one of the second direct current voltages.

* * * * *